United States Patent
Tian

(10) Patent No.: US 10,638,347 B2
(45) Date of Patent: Apr. 28, 2020

(54) METHOD, DEVICE AND COMPUTER STORAGE MEDIUM FOR TRANSMITTING A CONTROL MESSAGE

(71) Applicant: ZTE Corporation, Shenzhen (CN)

(72) Inventor: Jingxi Tian, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/508,707

(22) PCT Filed: Feb. 3, 2015

(86) PCT No.: PCT/CN2015/072185
§ 371 (c)(1),
(2) Date: Mar. 3, 2017

(87) PCT Pub. No.: WO2016/033938
PCT Pub. Date: Mar. 10, 2016

(65) Prior Publication Data
US 2017/0280345 A1  Sep. 28, 2017

(30) Foreign Application Priority Data

Sep. 4, 2014  (CN) .......................... 2014 1 0449572

(51) Int. Cl.
*H04W 24/10* (2009.01)
*H04W 72/12* (2009.01)
(Continued)

(52) U.S. Cl.
CPC .............. *H04W 24/10* (2013.01); *H04L 1/16* (2013.01); *H04L 1/1854* (2013.01); *H04L 29/06* (2013.01);
(Continued)

(58) Field of Classification Search
None
See application file for complete search history.

(56) References Cited

U.S. PATENT DOCUMENTS 8,315,243 B2   11/2012 Meylan
2009/0046631 A1  2/2009 Meylan
(Continued)

FOREIGN PATENT DOCUMENTS

CN   1719801 A   1/2006
CN   101296167 A   10/2008
(Continued)

OTHER PUBLICATIONS

International Search Report in international application No. PCT/CN2015/072185, dated Jun. 5, 2015.
(Continued)

*Primary Examiner* — Ruihua Zhang
(74) *Attorney, Agent, or Firm* — McDonald Hopkins LLC

(57) ABSTRACT

The disclosure discloses a method for transmitting a control message. The method includes that: when it is detected that a control message is to be sent, an indication message is generated, and the indication message is sent to a Media Access Control (MAC) layer together with the control message, the indication message being arranged to indicate that the current message is a control message; and the MAC layer detects the control message, calculates the number of the bytes of the control message and the number of the bytes of other data message respectively, determines bandwidths, and sends requests for the bandwidths to a scheduler to give a priority to the scheduling of the control message. The disclosure further discloses an Evolved Node B and User Equipment (UE), and a computer storage medium corresponding to the method for transmitting a control message.

11 Claims, 3 Drawing Sheets

(51) Int. Cl.
  *H04L 1/18*   (2006.01)
  *H04L 1/16*   (2006.01)
  *H04L 29/06*  (2006.01)
  *H04W 28/06*  (2009.01)
  *H04W 72/04*  (2009.01)
  *H04W 80/02*  (2009.01)
(52) U.S. Cl.
  CPC ....... *H04W 28/06* (2013.01); *H04W 72/0406* (2013.01); *H04W 72/1242* (2013.01); *H04W 80/02* (2013.01); *H04W 72/1278* (2013.01)

(56) References Cited

U.S. PATENT DOCUMENTS

| | | | | |
|---|---|---|---|---|
| 2009/0103478 | A1* | 4/2009 | Sammour | H04L 1/1874 370/328 |
| 2009/0310579 | A1 | 12/2009 | Furuta | |
| 2011/0013506 | A1* | 1/2011 | Ishii | H04W 72/1242 370/208 |
| 2013/0107843 | A1* | 5/2013 | Aoyama | H04W 28/10 370/329 |
| 2013/0148490 | A1* | 6/2013 | Yi | H04B 7/155 370/216 |
| 2013/0229931 | A1* | 9/2013 | Kim | H04W 24/10 370/252 |
| 2014/0098761 | A1* | 4/2014 | Lee | H04W 74/006 370/329 |
| 2015/0181593 | A1* | 6/2015 | Kim | H04W 24/02 370/329 |
| 2017/0013565 | A1* | 1/2017 | Pelletier | H04W 72/0473 |
| 2017/0150393 | A1* | 5/2017 | Payer | H04L 41/5022 |

FOREIGN PATENT DOCUMENTS

| | | |
|---|---|---|
| CN | 101785280 A | 7/2010 |
| CN | 102158901 A | 8/2011 |
| JP | 2006245887 A | 9/2006 |
| JP | 2007142752 A | 6/2007 |
| JP | 2008099079 A | 4/2008 |
| JP | 2009303030 A | 12/2009 |
| WO | 2009150613 A1 | 12/2009 |

OTHER PUBLICATIONS

English Translation of the Written Opinion of the International Search Authority in international application No. PCT/CN2015/072185, dated Jun. 5, 2015.
Radio Link Control (RLC) protocol specification, 3GPP TS 36.322 V12.0. 0, issued on Jun. 2014.

* cited by examiner

METHOD, DEVICE AND COMPUTER STORAGE MEDIUM FOR TRANSMITTING A CONTROL MESSAGE

TECHNICAL FIELD

The disclosure relates to a field of communication technologies, and more particularly, to a method, device and a computer storage medium for transmitting a control message.

BACKGROUND

A Long Term Evolution (LTE) network provides a mechanism for guaranteeing a Quality of Service (QoS) of all links. Specifically, for an air interface, a scheduling priority is clearly specified in a related protocol as an important parameter. A message of a Signalling Radio Bearer (SRB) is arranged to have the highest priority. In addition, different scheduling priorities are configured for different service types, i.e. different QoS Class Identifiers (QCIs).

In case of the current scheduling priority, if a Guaranteed Bit Rate (GBR) traffic completely occupies or is about to completely occupy (i.e., there are only a few bytes remaining in each Transmission Time Interval (TTI)) a bandwidth of an air interface, control messages of Packet Data Convergence Protocol (PDCP) and Radio Link Control (RLC) protocol which are born on a Non-Guaranteed Bit Rate (NGBR) bearer may be sent out with a relatively great delay or may not be sent out. In such case, an abnormity in a processing flow or a relatively great flow delay may be generated by a transmission timeout. Therefore, when traffic is relatively high, there may inevitably exist the problem of congestion of transmission of the control messages of the PDCP and RLC. Moreover, a large amount of air interface resources may be occupied and smooth transmission of the control messages cannot be ensured. In such case, the problems of no bandwidth called for the messages, great delay for message transmission and even message loss will occur. Therefore, it is necessary to propose a novel solution, in order to solve the abovementioned problems.

SUMMARY

In order to solve the existing technical problems, embodiments of the disclosure provide a method, device and a computer storage medium for transmitting a control message.

To this end, the technical solutions of the embodiments of the disclosure are implemented as follows.

The embodiments of the disclosure provide a method for transmitting a control message, which may include:

when it is detected that a control message of a PDCP layer is to be sent, an indication message is generated, and the indication message is sent to a Media Access Control (MAC) layer together with the control message, the indication message being arranged to indicate that the current message is a control message; and the MAC layer detects the control message, calculates the number of the bytes of the control message and the number of the bytes of other data message respectively, determines bandwidths, and sends requests for the bandwidths to a scheduler to give a priority to the scheduling of the control message.

In the solution, when the indication message is sent to the MAC layer together with the control message, the method may further include:

a message, which can be determined by the MAC layer to be a control message according to indication of the first bit of the bits of the header of the message, is sent directly to the MAC layer.

In the solution, the step that the control message is detected may include: when it is detected that the message is indicated to be a control message by the first bit of the bits of the header of the message or when it is detected that the message is indicated to be a control message by the indication message, the message is determined to be a control message.

In the solution, for an Evolved Node B (ENodeB) side, the step that the bandwidths are determined and the requests for the bandwidths are sent to the scheduler may be implemented as follows: the number of the bytes of the control message is determined as a minimum guaranteed bandwidth and a request for the minimum guaranteed bandwidth is sent to the scheduler; a sum of the number of the bytes of the control message and the number of the bytes of the other data message is determined as a maximum required bandwidth and a request for the maximum required bandwidth is sent to the scheduler; and for a User Equipment (UE) side, the step that the bandwidths are determined and the requests for the bandwidths are sent to the scheduler may include: the number of the bytes of the control message is incorporated into a bandwidth request of an SRB logical channel group, the number of the bytes of the other data message is incorporated into a bandwidth request of an original logical channel group, the bandwidth requests of these logical channel groups are reported to an ENodeB, and bandwidths allocated by the scheduler of the ENodeB are received.

In the solution, a content of the indication message may include a Radio Link Control Sequence Number (RLC SN) and Radio Bearer Identification (RB ID) of the control message.

Alternatively, in the solution, the content of the indication message may include the RLC SN and RB ID of the control message and an instance descriptor of UE.

The embodiments of the disclosure provide UE for transmitting a control message. The UE may include a first recognition unit, a first bandwidth request determination unit and a upload unit.

The first recognition unit is arranged to, when it is detected that a control message of a PDCP layer is to be sent, generate an indication message, and send the indication message to a MAC layer together with the control message.

The first bandwidth request determination unit is arranged to detect, at the MAC layer, whether a message is a control message, calculate the number of the bytes of the control message and the number of the bytes of other data message respectively, determine bandwidths, and send requests for the bandwidths to a scheduler of an ENodeB for allocating the bandwidths.

The uploading unit is arranged to give a priority to the upload of the control message.

In the solution, the first recognition unit may further be arranged to directly send a message, which can be determined by the MAC layer to be a control message according to indication of the first bit of the bits of the header of the message, to the MAC layer.

In the solution, the first bandwidth request determination unit may be arranged to, when it is detected that the message is indicated to be a control message by the first bit of the bits of the header of the message or when it is detected that the message is indicated to be a control message by the indication message, determine the message to be a control message; and incorporate the number of the bytes of the control message into a bandwidth request of an SRB logical channel group, incorporate the number of the bytes of the other data message into a bandwidth request of an original logical channel group, report the bandwidth requests of these logical channel groups to the ENodeB, and receive bandwidths allocated by the scheduler of the ENodeB.

In the solution, a content of the indication message may include an RLC SN and RB ID of the control message.

The embodiments of the disclosure provide an ENodeB for transmitting a control message. The ENodeB may include a second recognition unit, a second recognition unit and a scheduling unit.

The second recognition unit is arranged to, when it is detected that a control message of a PDCP layer is to be sent, generate an indication message, and send the indication message to a MAC layer together with the control message.

The second bandwidth request determination unit is arranged to detect, at the MAC layer, whether a message is a control message, calculate the number of the bytes of the control message and the number of the bytes of other data message respectively, determine bandwidths, and send requests for the bandwidths to a scheduler.

The scheduling unit is arranged to give a priority to the scheduling of the control message.

In the solution, the second recognition unit may further be arranged to directly send a message, which can be determined by the MAC layer to be a control message according to indication of the first bit of the bits of the header of the message, to the MAC layer.

In the solution, the second bandwidth request determination unit may be arranged to:

when it is detected that the message is indicated to be a control message by the first bit of the bits of the header of the message or when it is detected that the message is indicated to be a control message by the indication message, determine the message to be a control message;

determine the number of the bytes of the control message as a minimum guaranteed bandwidth and send a request for the minimum guaranteed bandwidth to the scheduling unit; determine a sum of the number of the bytes of the control message and the number of the bytes of the other data message as a maximum required bandwidth and send a request for the maximum required bandwidth to the scheduling unit.

The embodiments of the disclosure provide a computer storage medium containing a set of instructions, the instructions, when being executed, cause at least one processor to execute the abovementioned method for transmitting a control message.

In the embodiments of the disclosure, by generating the indication message, sending the indication message to the MAC layer together with the control message, and giving a higher priority to the scheduling of the control message, priority is given to the scheduling of the control messages of the PDCP layer and an RLC layer and the control message will be timely sent out. As such, congestion of transmission of the control messages when traffic is relatively high can be effectively avoided, the problems of control message loss and great transmission delay caused by link congestion are solved, and a processing capability and performance of a communication system can be improved.

DETAILED DESCRIPTION

Figure 1:
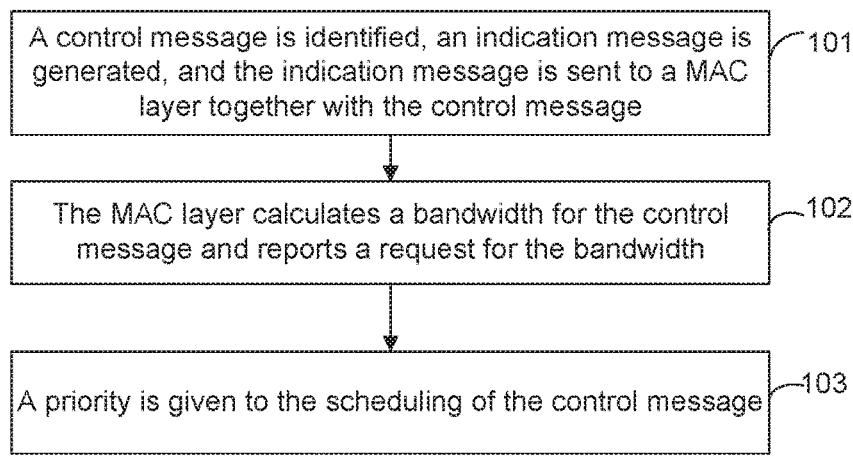
FIG. 1 is a flowchart of control message transmission according to an embodiment of the disclosure.

In order to make the purpose, technical solutions and advantages of the disclosure clearer, the disclosure will be further described in detail below in conjunction with the embodiments with reference to the drawings.

The embodiments of the disclosure provide a method for transmitting a control message, to solve the problem of congestion of transmission of control messages in an LTE system. The method includes the following steps.

In Step 101, a control message is identified, an indication message is generated, and the indication message is sent to a MAC layer together with the control message.

Specifically, when it is detected that the control message is to be sent, the indication message corresponding to the control message is generated, and the indication message is sent to the MAC layer together with the control message.

In the embodiments of the disclosure, when it is detected that a PDCP status report, a Robust Header Compression (ROCH) feedback message or an RLC Acknowledged Mode (AM) status report is to be sent, a corresponding indication message is generated, and the indication message is sent to the MAC layer together with the control message.

The indication message is arranged to indicate that the current message is a control message. In the embodiments of the disclosure, when an RLC layer detects that the control message is to be sent, that is, when it is detected that the message is indicated to be a control message by the first bit of the header of the message, the indication message is generated which contains an RLC SN and RB ID of the control message, or the indication message is generated which contains the RLC SN and RB ID of the control message and an instance descriptor of UE. The indication message is notified to the MAC layer together with the control message to be sent.

In Step 102, the MAC layer calculates and reports a bandwidth request of the control message.

Specifically, the MAC layer detects the control message on the basis of the indication message, calculates the number of the bytes of the control message and the number of the bytes of another normal data message respectively. The MAC layer determines a bandwidth according to the calculated number of the bytes, and sends a request for the bandwidth to a scheduler.

Practically, PDCP and RLC control messages and data messages may both be born on a Data Radio Bearer (DRB). In the embodiments of the disclosure, the "data messages" refer to messages which are indicated by first bits of the PDCP or RLC messages on the DRB not to be control messages. A PDCP (36323-860) and an RLC protocol (36322-870) are specifically referred.

Specifically, if detecting that an RLC message is indicated by its header to be a control message or detecting that a message is the control message according to the indication message, the MAC layer may place the control message at a header of a list to be scheduled or in an independent list to be scheduled.

In Step 103, a priority is given to the scheduling of the control message.

Specifically, when the control message is scheduled, scheduling is performed on the basis of the bandwidth request, and the bandwidth request (such as a request for the minimum guaranteed bandwidth and a bandwidth request of an SRB logical channel group) corresponding to the control message has a scheduling priority higher than the scheduling priority of an ordinary DRB message and lower than or equal to the scheduling priority of an SRB message. That is, after finishing scheduling SRB messages, the scheduler preferably schedules control messages of the PDCP and RLC layers, and then schedules other DRB messages according to priorities set by the protocols. The DRB messages mainly function to transmit Evolved Radio Access Bearer (ERAB) data packets between the UE and the ENodeB. During a practical application, in Step 103, the normal data message may be scheduled according to priorities specified by the following Table 1.

TABLE 1

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |

Embodiment 1

Figure 2:
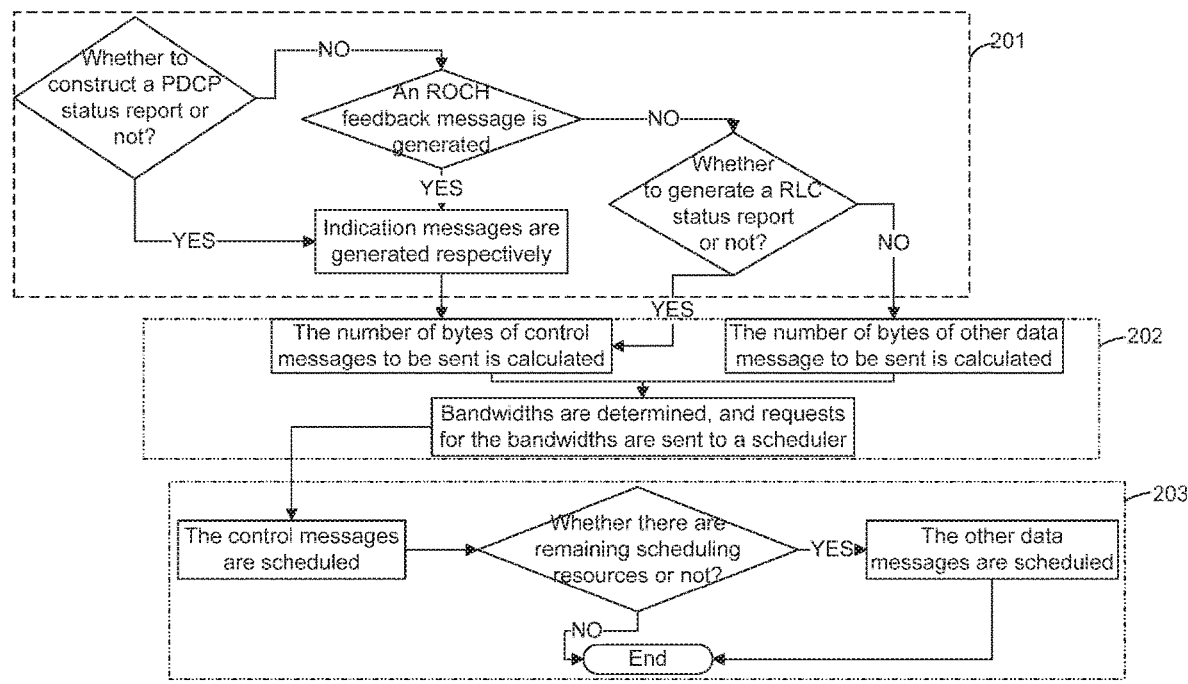
FIG. 2 is a flowchart of control message transmission on an ENodeB side according to embodiment 1 of the disclosure.

The embodiment provides a method for transmitting a control message for an ENodeB side, to solve the problem of high congestion rate of transmission of control messages on the ENodeB side in an LTE system. As shown in FIG. 2, the method includes the following steps.

In Step 201, an RLC layer receives a PDCP message sent by a PDCP layer, and detects that the PDCP message is indicated to be a control message by the first bit of the PDCP message. Further, in Step 201, when RLC Service Data Units (SDUs) form a Protocol Data Unit (PDU), the RLC layer generates an indication message of the control message which is arranged to indicate that the current message is a control message to be emergently scheduled, and sends the indication message to a MAC layer together with the control message and other control messages.

The control message of the PDCP layer may include a PDCP status report and/or an ROCH feedback message. The other control messages may include an RLC state report generated by the RLC layer and the like. Generally, the control messages sent by the RLC layer include the three control messages. In the embodiment of the disclosure, the PDCP status report and the ROCH feedback message require corresponding indication messages, and the RLC status report does not require generation of an indication message.

The content of the indication message may be an RLC SN and RB ID of the control message and an instance descriptor of UE.

In Step 202, after the messages is received from the RLC layer, the MAC layer detects messages required to be emergently scheduled. That is, the MAC layer detects the control messages. Then the MAC layer calculates the number of the bytes of these control messages to be sent and the number of the bytes of other data messages to be sent on a current Radio Bearer (RB) respectively. The MAC layer determines the number of the bytes of the control messages as a minimum guaranteed bandwidth. The MAC layer determines a sum of the number of the bytes of the control messages and the number of the bytes of the other data messages as a maximum required bandwidth, and notifies the minimum guaranteed bandwidth and the maximum required bandwidth to a scheduler respectively. That is, a request for the minimum guaranteed bandwidth and a request for the maximum required bandwidth are sent to the scheduler respectively.

When detecting that a message sent by the RLC layer is indicated to be a control message by the first bit of the bits of the header or when detecting that the current message is indicated to be a control message by the indication message, the MAC layer determines that the message is the control message. That is, the MAC layer determines that the message is the control message to be emergently scheduled. For example, when the control messages sent in Step 201 simultaneously include the PDCP status report, the ROCH feedback message and the RLC status report, the PDCP status report and the RHOCH feedback message are determined to be control messages by their corresponding indication messages respectively. In such case, the RLC status report is determined to be a control message by indication of the first bit of the bits of the header of the RLC message.

Here, the minimum guaranteed bandwidth is calculated on the basis of the number of the bytes of all the detected control messages, including both control messages with indication messages and control messages which can be determined by first bits of headers of the messages. For example, when the control messages sent in Step 201 include the PDCP status report, the ROCH feedback message and the RLC status report, a sum of the number of the bytes of the PDCP status report, number of the bytes of the ROCH feedback message and number of the bytes of the RLC status report is determined as the minimum guaranteed bandwidth.

In Step 203, in case where air interface resources are limited, the scheduler preferably schedules the messages of the minimum guaranteed bandwidth request. That is, a priority is given to the scheduling of the control messages. Then, if it is judged that there are remaining scheduling resources, a scheduling request of another bearer in the same cell is responded. That is, if there are the remaining scheduling resources, the other data messages, for which the request for the maximum required bandwidth is made, are scheduled. Here, under the same bearer, control messages may be preferably scheduled. In a cell, scheduling priorities of messages to be emergently scheduled are higher than the scheduling priority of the SRB data, and are also higher than the scheduling priority of other data messages of the same cell.

Figure 3:
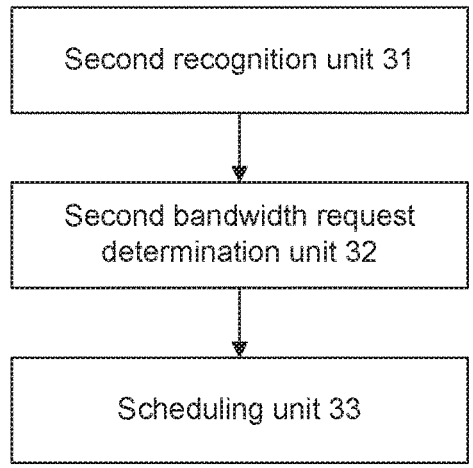
FIG. 3 is a diagram showing a structure of an ENodeB according to embodiment 1 of the disclosure.

Correspondingly, the embodiment further provides an ENodeB for transmitting a control message. As shown in FIG. 3, the ENodeB includes a second recognition unit 31, second bandwidth request determination unit 32 and scheduling unit 33.

The second recognition unit 31 is arranged to, when it is detected that a control message of a PDCP layer is to be sent, generate an indication message, and send the indication message to a MAC layer together with the control message.

The indication message is arranged to indicate that the current message is a control message. The content of the indication message may include an RLC SN and RB ID of the control message and an instance descriptor of UE. The control message of the PDCP layer may specifically be a PDCP status report, and/or an ROCH feedback message.

For another control message, such as an RLC status report, if the MAC layer may determine whether a message is a control message or not by indication of the first bit of the bits of the header of the message, the second recognition unit 31 may directly send the message to the MAC layer without generating any indication message. A second bandwidth request determination unit 32 is arranged to detect, at the MAC layer, which one/ones of the messages to be sent is/are to control message/control messages, calculate the number of the bytes of the control message(s) and the number of the bytes of other data message respectively, determine bandwidths and send requests for the bandwidths to a scheduling unit 33.

When it is detected, at the MAC layer, that the message is indicated to be a control message by the first bit of the bits of the header of the message or when it is detected, at the MAC layer, that the message is indicated to be a control message by the indication message, the second bandwidth request determination unit 32 determines the message to be a control message, i.e. a control message to be emergently scheduled.

Here, the second bandwidth request determination unit 32 sends the number of the bytes of the control message to a scheduler as a request for the minimum guaranteed bandwidth, and sends a sum of the number of the bytes of the control message and the number of the bytes of the other data message to the scheduling unit 33 as a request for the maximum required bandwidth.

The scheduling unit 33 is arranged to give a priority to the scheduling of the control message. Then, if there are remaining scheduling resources, the other data message of the request for the maximum required bandwidth is scheduled.

During a practical application, the second recognition unit 31 and the second bandwidth request determination unit 32 may be implemented by a Central Processing Unit (CPU), Micro Control Unit (MCU), Digital Signal Processor (DSP) or Field-Programmable Gate Array (FPGA) in the ENodeB. The scheduling unit 33 may be implemented by the scheduler in the ENodeB.

Embodiment 2

Figure 4:
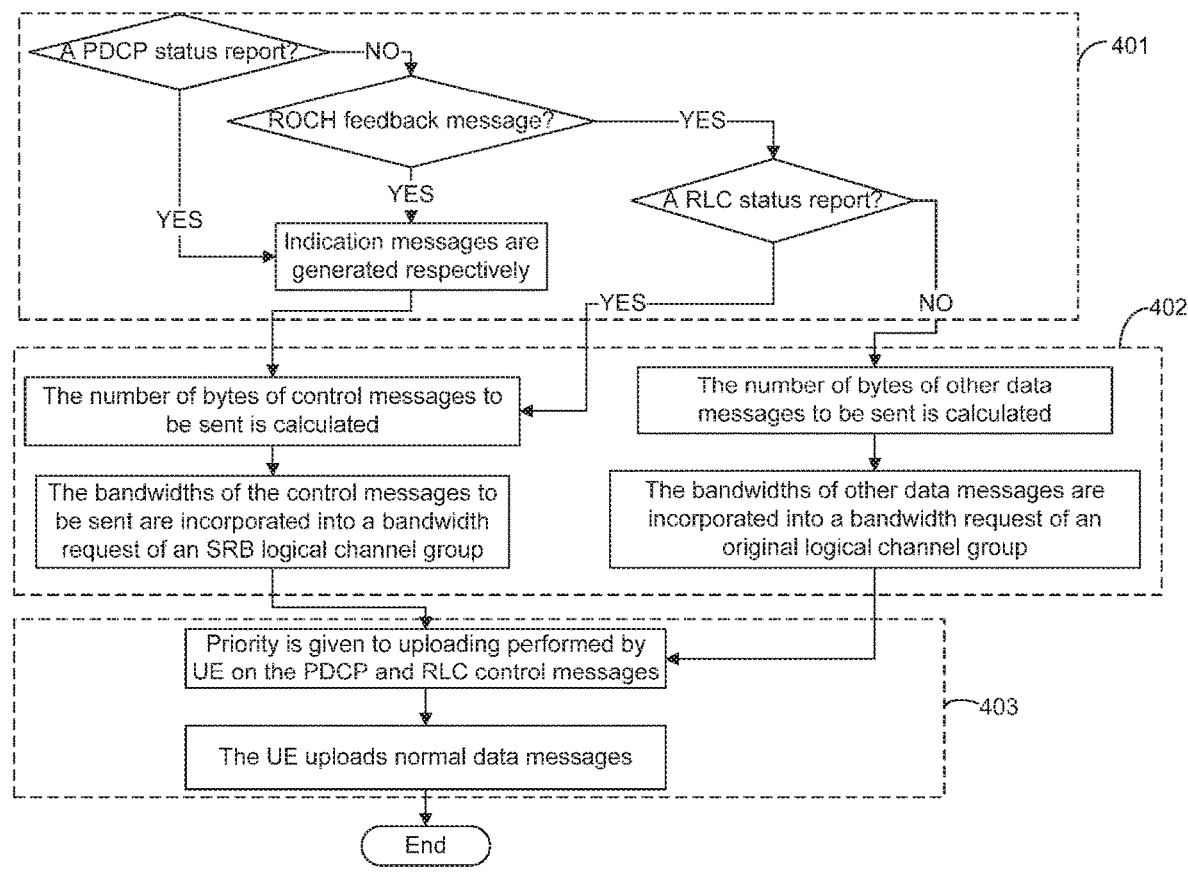
FIG. 4 is a flowchart of control message transmission on a UE side according to embodiment 2 of the disclosure.

The embodiment provides a method for transmitting a control message for a UE side, to solve the problem of high congestion rate of transmission of control messages on the UE side in an LTE system. As shown in FIG. 4, the method includes the following steps.

In Step 401, an RLC layer receives a PDCP message sent by a PDCP layer, and detects that the PDCP message is indicated to be a control message by the first bit. When RLC SDUs form a PDU, the RLC layer generates an indication message of the control message. The indication message is arranged to indicate that the current message is a control message to be emergently scheduled. Then the RLC layer sends the indication message to a MAC layer together with the control message and other control messages.

The control message of the PDCP layer may include a PDCP status report and/or an ROCH feedback message. The other control messages may include an RLC state report generated by the RLC layer and the like. Generally, the control messages sent by the RLC layer include the three control messages. In the embodiment of the disclosure, the PDCP status report and the ROCH feedback message require corresponding indication messages, and the RLC status report does not require generation of an indication message.

In Step 402, after receiving the messages sent by the RLC layer, the MAC layer detects which one/ones of the messages to be sent is the message/messages to be emergently scheduled. That is, the MAC layer detects which message/messages is/are the control message/control messages. Then the MAC layer calculates the number of the bytes of the control messages and the number of the bytes of other normal data messages respectively. The MAC layer incorporates the number of the bytes of the control messages into a bandwidth request of an SRB logical channel group, and incorporates the number of the bytes of the other data messages to be sent into a bandwidth request of an original logical channel group. The UE reports the bandwidth requests of these logical channel groups to a scheduler of an ENodeB. The scheduler of the ENodeB allocates the bandwidths, and then the UE receives bandwidths allocated by the ENodeB.

When detecting that a message sent by the RLC layer is indicated to be a control message by the first bit of the bits of the header of the message, or when detecting that the current message is indicated to be the control message by the indication message, the MAC layer determines that the message is the control message which is to be emergently scheduled. For example, when the control messages sent in Step 401 include the PDCP status report, the ROCH feedback message and the RLC status report, the PDCP status report and the RHOCH feedback message are determined to be control messages by corresponding indication messages of the PDCP status report and the RHOCH feedback message respectively, and the RLC status report is determined to be a control message by indication of the first bit of the bits of the header of the RLC message.

Here, the number of the bytes of all the detected control messages, are incorporated into the bandwidth request of the SRB logical channel group. Said all the detected control message include both control messages with indication messages and control messages which can be determined by first bits of headers of the messages. For example, when the control messages sent in Step 401 include the PDCP status report, the ROCH feedback message and the RLC status report, the number of the bytes of all the PDCP status report, the ROCH feedback message and the RLC status report is incorporated into the bandwidth request of the SRB logical channel group.

In Step 403: the UE preferably uploads the control messages, and then reports the other normal data messages, such as GBR and NGBR data messages.

Figure 5:
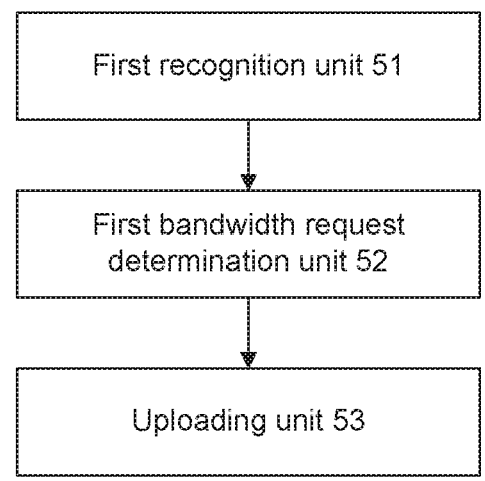
FIG. 5 is a diagram showing a structure of UE according to embodiment 2 of the disclosure.

Correspondingly, the embodiment further provides a UE for transmitting a control message. As shown in FIG. 5, the UE includes a first recognition unit 51, first bandwidth request determination unit 52 and uploading unit 53.

The first recognition unit 51 is arranged to, when an RLC layer detects that a control message of a PDCP layer is to be sent, generate an indication message, and send the indication message to a MAC layer together with the control message.

The control message of the PDCP layer may be a PDCP status report and/or an ROCH feedback message.

For another control message, such as an RLC status report, if the MAC layer may determine whether a message is a control message or not by indication of the first bit of the bits of the header of the message, the first recognition unit 51 may directly send the message to the MAC layer without generating any indication message.

The content of the indication message may include an RLC SN and RB ID of the control message.

The first bandwidth request determination unit 52 is arranged to detect, at the MAC layer, control messages, calculate the number of the bytes of the control messages and the number of the bytes of other data messages respectively, determine bandwidths and send requests for the bandwidths to a scheduler of an ENodeB.

Here, when it is detected that an RLC message is indicated to be a control message by the first bit of the bits of the header of the RLC messages, or when it is detected that the message is indicated to be a control message by the indication message, the first bandwidth request determination unit 52 determines the message to be a control message which is to be emergently scheduled.

Specifically, the first bandwidth request determination unit 52 incorporates the number of the bytes of the control messages into a bandwidth request of an SRB logical channel group, incorporates the number of the bytes of the other data messages into a bandwidth request of an original logical channel group. Then the first bandwidth request determination unit 52 reports the bandwidth requests of these logical channel groups to the ENodeB, and receives bandwidths allocated by the scheduler of the ENodeB.

The uploading unit 53 is arranged to give a priority to the uploading of the control messages, and then report the other normal data messages, such as GBR and NGBR data messages.

During a practical application, the first recognition unit 51 may be implemented by a CPU, MCU, DSP or FPGA in the UE. The first bandwidth request determination unit 52 and the uploading unit 53 may be implemented by combining the CPU, MCU, DSP or FPGA in the UE and a transceiver.

Apparently, those skilled in the art should know that each module or each step of the embodiments of the disclosure may be implemented by a general-purpose computing device. The modules or steps may be concentrated on a single computing device or distributed on a network formed by a plurality of computing devices. Alternatively, the modules or steps may be implemented by program codes executable for the computing devices, so that the modules or steps may be stored in a storage device for execution with the computing devices. In some circumstances, the steps as shown or described may be executed in sequences different from those described herein. The modules or steps may be formed as respective integrated circuit modules. Alternatively, the modules or steps may be formed as a single integrated circuit module to implement the modules or steps. As a consequence, the disclosure is not limited to a combination of any specific hardware and software.

Those skilled in the art shall know that the embodiments of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

On such a basis, the embodiments of the disclosure provide a computer storage medium, which includes a set of instructions, the instructions being executed to cause at least one processor to execute the abovementioned method for transmitting a control message.

The above is only the preferred embodiment of the disclosure and not intended to limit the scope of protection of the disclosure.

What is claimed is:

1. A method for transmitting a control message, comprising:
   sending, by a Radio Link Control (RLC) layer, a control message to a Media Access Control (MAC) layer, wherein the control message can be determined by the MAC layer to be a control message of the RLC layer according to an indication of a first bit of a header of the control message;
   detecting, by the MAC layer, whether a message is the control message according to the first bit of the header of the message, and when the message is the control message, calculating a number of bytes of the control message and a number of bytes of other data messages respectively, determining bandwidths for scheduling messages, and sending requests for the bandwidths to a scheduler to give a priority to a scheduling of the control message, wherein the other data messages comprises messages in Data Radio Bearer (DRB) which are indicated by the first bit of the header of the message not to be the control message, wherein:
      for an Evolved Node B (ENodeB) side, determining the bandwidths for scheduling messages and sending the requests for the bandwidths to the scheduler comprises: determining the number of the bytes of the control message as a minimum guaranteed bandwidth and sending a request for the minimum guaranteed bandwidth to the scheduler; determining a sum of the number of the bytes of the control message and the number of the bytes of the other data messages as a maximum required bandwidth and sending a request for the maximum required bandwidth to the scheduler, or
      for a User Equipment (UE) side, determining the bandwidths for scheduling messages and sending the requests for the bandwidths to the scheduler comprises: incorporating the number of the bytes of the control message into a bandwidth request of a Signalling Radio Bearer (SRB) logical channel group, incorporating the number of the bytes of the other data messages into a bandwidth request of an original logical channel group, reporting the requests for the bandwidths of these logical channel groups to an ENodeB, and receiving bandwidths allocated by the scheduler of the ENodeB,
   wherein the control message of the RLC layer comprises an RLC Acknowledged Mode (AM) state report generated by the RLC layer and carried in the DRB,
   wherein to give the priority to the scheduling of the control message comprises: to schedule messages in a following order of priorities: a Signalling Radio Bearer (SRB) message, the RLC AM state report in the DRB, the other data messages in the same DRB.

2. A non-transitory computer-readable storage medium containing a set of instructions, the instructions, when being executed, cause at least one processor to execute the method for transmitting a control message according to claim 1.

3. The method according to claim 1, wherein before the RLC layer sends the control message to the MAC layer, the method further comprises:
   detecting, by the RLC layer, whether the control message further comprises a control message of a Packet Data Convergence Protocol (PDCP) layer is to be sent, and in response to determining that the control message comprises the control message of the PDCP layer, generating an indication message for indicating that the current message is the control message of the PDCP layer,
   wherein the RLC layer sending the control message to the MAC layer comprises sending the indication message to the MAC layer together with the control message,
   wherein the MAC layer detects whether a message is the control message further comprises detecting, by the MAC layer, according to the indication message, and
   wherein the control message of the PDCP layer, which is sent from the PDCP layer to the RLC layer and is carried in the DRB, comprises at least one of a PDCP status report or a Robust Header Compression (ROHC) feedback message;
   wherein to give the priority to the scheduling of the control message comprises: to schedule messages in a following order of priorities: a Signalling Radio Bearer (SRB) message, both the RLC AM state report and the control message of the PDCP layer in the DRB, the other data messages in the same DRB.

4. The method according to claim 1, wherein a content of the indication message comprises a Radio Link Control Sequence Number (RLC SN) and Radio Bearer Identification (RB ID) of the control message.

5. A non-transitory computer-readable storage medium containing a set of instructions, the instructions, when being executed, cause at least one processor to execute the method for transmitting a control message according to claim 3.

6. A User Equipment (UE) for transmitting a control message, comprising: at least one processor arranged to execute computer-readable instructions for implementing:
   a first recognition unit, arranged to detect, at a Radio Link Control (RLC) layer, that a control message, which can be determined by a Media Access Control (MAC) layer to be a control message of the RLC layer according to an indication of a first bit of a header of the control message, is to be sent, and send the control message to the MAC layer;
   a first bandwidth request determination unit, arranged to detect, at the MAC layer, whether a message is the control message according to the first bit of the header of the message, and when the message is the control message, calculate a number of the bytes of the control message and a number of the bytes of other data messages respectively, incorporate the number of the bytes of the control message into a bandwidth request of a Signalling Radio Bearer (SRB) logical channel group, incorporate the number of the bytes of the other data messages into a bandwidth request of an original logical channel group, report the bandwidth requests of these logical channel groups to a scheduler of an Evolved Node B (ENodeB), and receive bandwidths allocated by the scheduler of the ENodeB, wherein the other data messages comprises messages in Data Radio Bearer (DRB) which are indicated by the first bit of the header of the message not to be the control message; and an uploading unit, arranged to give a priority to an uploading of the control message, and report Guaranteed Bit Rate (GBR) and Non-Guaranteed Bit Rate (NGBR) data messages, wherein the control message of the RLC layer comprises an RLC Acknowledged Mode (AM) state report generated by the RLC layer and carried in the DRB, wherein to give the priority to the uploading of the control message comprises: to schedule messages in a following order of priorities: a Signalling Radio Bearer (SRB) message, the RLC AM state report in the DRB, the other data messages in the same DRB.

7. The UE according to claim 6, wherein the first recognition unit is further arranged to, detect, at the RLC layer, that the control message comprising a control message of a Packet Data Convergence Protocol (PDCP) layer is to be sent, generate an indication message, and send the indication message to the MAC layer together with the control message, wherein the first bandwidth request determination unit is further arranged to detect, at the MAC layer, whether a message is the control message according to the indication message, and wherein the control message of the PDCP layer, which is sent from the PDCP layer to the RLC layer and is carried in the DRB, comprises at least one of a PDCP status report or a Robust Header Compression (ROHC) feedback message;

wherein to give the priority to the scheduling of the control message comprises: to schedule messages in a following order of priorities: a Signalling Radio Bearer (SRB) message, both the RLC AM state report and the control message of the PDCP layer in the DRB, the other data messages in the same DRB.

8. The UE according to claim 7, wherein a content of the indication message comprises a Radio Link Control Sequence Number (RLC SN) and Radio Bearer Identification (RB ID) of the control message.

9. An Evolved Node B (ENodeB) for transmitting a control message, comprising: at least one processor arranged to execute computer-readable instructions for implementing a second recognition unit and a second bandwidth request determination unit, wherein:

the second recognition unit is arranged to detect, at a Radio Link Control (RLC) layer, that a control message, which can be determined by a Media Access Control (MAC) layer to be a control message of the RLC layer according to an indication of a first bit of a header of the control message, is to be sent, and send the control message to the MAC layer, wherein the control message of the RLC layer comprises an RLC Acknowledged Mode (AM) state report generated by the RLC layer and carried in Data Radio Bearer (DRB);

the second bandwidth request determination unit is arranged to detect, at the MAC layer, whether a message is the control message according to the first bit of the header of the message, and when the message is the control message, calculate a number of the bytes of the control message and a number of the bytes of other data messages respectively, determine the number of the bytes of the control message as a minimum guaranteed bandwidth and send a request for the minimum guaranteed bandwidth to a scheduling unit; determine a sum of the number of the bytes of the control message and the number of the bytes of the other data messages as a maximum required bandwidth and send a request for the maximum required bandwidth to the scheduling unit, wherein the other data messages comprises messages in the DRB which are indicated by the first bit of the header of the message not to be the control message; and a scheduler, arranged to give a priority to the scheduling of the control message in a following order of priorities: a Signalling Radio Bearer (SRB) message, the RLC AM state report in the DRB, the other data messages in the same DRB.

10. The ENodeB according to claim 9, wherein the second recognition unit is further arranged to, detect, at the RLC layer, that the control message comprising a control message of a Packet Data Convergence Protocol (PDCP) layer is to be sent, generate an indication message, and send the indication message to the MAC layer together with the control message, wherein the second bandwidth request determination unit is further arranged to detect, at the MAC layer, whether a message is the control message according to the indication message, and wherein the control message of the PDCP layer, which is sent from the PDCP layer to the RLC layer and is carried in the DRB, comprises at least one of a PDCP status report or a Robust Header Compression (ROHC) feedback message;

wherein to give the priority to the scheduling of the control message comprises: to schedule messages in a following order of priorities: a Signalling Radio Bearer (SRB) message, both the RLC AM state report and the control message of the PDCP layer in the DRB, the other data messages in the same DRB.

11. The ENodeB according to claim 10, wherein a content of the indication message comprises a Radio Link Control Sequence Number (RLC SN) and Radio Bearer Identification (RB ID) of the control message and an instance descriptor of a User Equipment (UE).

* * * * *